(12) United States Patent
Shi et al.

(10) Patent No.: US 11,402,684 B2
(45) Date of Patent: Aug. 2, 2022

(54) DISPLAY ASSEMBLY, DISPLAY DEVICE AND METHOD FOR CONTROLLING THE DISPLAY DEVICE

(71) Applicants: Wuhan BOE Optoelectronics Technology Co., Ltd., Hubei (CN); BOE Technology Group Co., Ltd., Beijing (CN)

(72) Inventors: Xia Shi, Beijing (CN); Yuanhui Guo, Beijing (CN); Yujie Gao, Beijing (CN); Yang Hu, Beijing (CN); Peipei Zhang, Beijing (CN)

(73) Assignees: Wuhan BOE Optoelectronics Technology Co., Ltd., Wuhan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/488,099

(22) Filed: Sep. 28, 2021

(65) Prior Publication Data

US 2022/0137454 A1    May 5, 2022

(30) Foreign Application Priority Data

Oct. 30, 2020 (CN) .......................... 202011194316.0

(51) Int. Cl.
*G02F 1/1335* (2006.01)
*G02F 1/133* (2006.01)
*G02F 1/1347* (2006.01)
*G02F 1/1362* (2006.01)

(52) U.S. Cl.
CPC ...... *G02F 1/133531* (2021.01); *G02F 1/1347* (2013.01); *G02F 1/13306* (2013.01); *G02F 1/133555* (2013.01); *G02F 1/1362* (2013.01); *G02F 1/133514* (2013.01)

(58) Field of Classification Search
CPC ................................................ G02F 1/133531
See application file for complete search history.

(56) References Cited

U.S. PATENT DOCUMENTS 10,490,138 B2 * 11/2019 Nam .................... G09G 3/3655
2012/0062527 A1 * 3/2012 Cheong ................. G02F 1/1347
345/204

* cited by examiner

*Primary Examiner* — Edmond C Lau
(74) *Attorney, Agent, or Firm* — IPRO, PLLC

(57) ABSTRACT

The present disclosure provides a display assembly, a display device and a method for controlling the display device. The display assembly includes a first polarizer, a first liquid crystal panel, a second polarizer, a second liquid crystal panel and a third polarizer laminated one on another sequentially. One of the first liquid crystal panel and the second liquid crystal panel is a display panel, and the other is a light-transmitting control panel. The display assembly further includes a first semi-transparent reflective layer and a second semi-transparent reflective layer located on two sides of the light-transmitting control panel, respectively.

20 Claims, 2 Drawing Sheets

DISPLAY ASSEMBLY, DISPLAY DEVICE AND METHOD FOR CONTROLLING THE DISPLAY DEVICE

CROSS-REFERENCE TO RELATED APPLICATIONS

This application claims a priority to Chinese Patent Application No. 202011194316.0 filed in China on Oct. 30, 2020, which is incorporated in its entirety by reference herein.

TECHNICAL FIELD

The present disclosure relates to the field of display technologies, and in particular to a display assembly, a display device and a method for controlling the display device.

BACKGROUND

A mirror display device is referred to as a display device having both a display function and a reflection function. When used to provide the display function, it is able for the mirror display device to normally display an image, and when used to provide the reflection function, light is reflected by the mirror display device, so as to achieve a mirror-like reflection function.

SUMMARY

In a first aspect, a display assembly is provided in the embodiment of the present disclosure, including a first polarizer, a first liquid crystal panel, a second polarizer, a second liquid crystal panel and a third polarizer laminated one on another sequentially. One of the first liquid crystal panel and the second liquid crystal panel is a display panel, and the other is a light-transmitting control panel. The display assembly further includes a first semi-transparent reflective layer and a second semi-transparent reflective layer located on two sides of the light-transmitting control panel, respectively.

In some embodiments, the first liquid crystal panel is the display panel, and the second liquid crystal panel is the light-transmitting control panel.

In some embodiments, the second semi-transparent reflective layer is integrated with the third polarizer.

In some embodiments, an area of an orthogonal projection of the second semi-transparent reflective layer onto the third polarizer is less than or equal to an area of the third polarizer.

In some embodiments, light reflected by the second semi-transparent reflective layer faces the third polarizer.

In some embodiments, the first semi-transparent reflective layer and/or the second semi-transparent reflective layer are/is integrated with the light-transmitting control panel.

In some embodiments, the display panel includes an array substrate and a color film substrate, and the array substrate of the display panel is closer to the third polarizer than the color film substrate of the display panel.

In some embodiments, the light-transmitting control panel includes an array substrate and an opposing substrate, and the array substrate of the light-transmitting control panel is closer to the third polarizer than the opposing substrate of the light-transmitting control panel.

In some embodiments, a difference between an angle of a transmission axis of the first polarizer and an angle of a transmission axis of the second polarizer is 90 degrees, and the angle of the transmission axis of the first polarizer and an angle of a transmission axis of the third polarizer are the same.

In some embodiments, an angle of a transmission axis of the first semi-transparent reflective layer and the angle of the transmission axis of the second polarizer are the same.

In some embodiments, the first semi-transparent reflective layer is integrated with the second polarizer.

In some embodiments, a reflectivity of the first semi-transparent reflective layer toward the third polarizer and a reflectivity the first semi-transparent reflective layer toward the first polarizer are each not less than 30%.

In some embodiments, light reflected by the first semi-transparent reflective layer faces the third polarizer.

In some embodiments, light reflected by the first semi-transparent reflective layer faces the third polarizer and the first polarizer.

In some embodiments, the first semi-transparent reflective layer is made of a same material as the second semi-transparent reflective layer.

In a second aspect, a display device is further provided in the embodiment of the present disclosure, including a backlight source and the display assembly as described in the first aspect.

In a third aspect, a method for controlling the display device as described in the second aspect is further provided in the embodiment of the present disclosure, including: in a case that a target display region of the display device is to achieve a reflection function, controlling a region, corresponding to the target display region, of the light-transmitting control panel to keep light in an original polarization state.

In some embodiments, the method further includes: in a case that the target display region of the display device is to achieve a display function, controlling a region, corresponding to the target display region, of the display panel to convert light into polarized light having a polarization angle identical to an angle of a transmission axis of the second polarizer, and controlling the region, corresponding to the target display region, of the light-transmitting control panel to convert the light into polarized light having a polarization angle identical to an angle of a transmission axis of the third polarizer.

In some embodiments, at least one first region of target display regions of the display device is to achieve the reflection function and at least one second region of the target display regions is to achieve the display function, the second region is different from the first region, and the method further includes: controlling a region, corresponding to the at least one first region, of the light-transmitting control panel to keep light in the original polarization state; and controlling a region, corresponding to the at least one second region, of the display panel to convert light into polarized light having a polarization angle identical to an angle of a transmission axis of the second polarizer, and controlling a region, corresponding to the at least one second region, of the light-transmitting control panel to convert the light into polarized light having a polarization angle identical to an angle of a transmission axis of the third polarizer.

BRIEF DESCRIPTION OF THE DRAWINGS

In order to illustrate the technical solutions of the embodiments of the present disclosure in a clearer manner, the drawings required for the description of the embodiments of the present disclosure will be described hereinafter briefly. Obviously, the following drawings merely relate to some embodiments of the present disclosure, and based on these drawings, a person of ordinary skill in the art may obtain other drawings without any creative effort.

DETAILED DESCRIPTION

The technical solutions in the embodiments of the present disclosure will be described hereinafter clearly and completely with reference to the drawings of the embodiments of the present disclosure. Obviously, the following embodiments merely relate to a part of, rather than all of, the embodiments of the present disclosure, and based on these embodiments, a person of ordinary skill in the art may, without any creative effort, obtain other embodiments, which also fall within the scope of the present disclosure.

In order to ensure a normal display function, a mirror reflection device in the related art has a poor reflection effect during a reflection function.

A display assembly is provided in the embodiment of the present disclosure.

Figure 1:
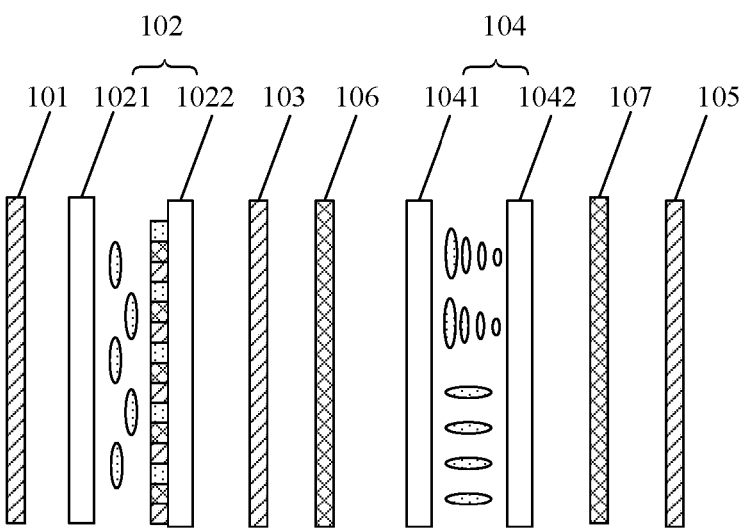
FIG. 1 is a schematic diagram of a display device according to an embodiment of the present disclosure.

As shown in FIG. 1, in an embodiment, the display assembly includes a first polarizer 101, a first liquid crystal panel 102, a second polarizer 103, a second liquid crystal panel 104 and a third polarizer 105 laminated one on another sequentially.

In the embodiment, one of the first liquid crystal panel 102 and the second liquid crystal panel 104 is a display panel, while the other is a light-transmitting control panel. Specifically, the first liquid crystal panel may be the display panel, and the second liquid crystal panel may be the light-transmitting control panel. Alternatively, the first liquid crystal panel may be the light-transmitting control panel, the second liquid crystal panel may be the display panel, and substantially the same display effect may be achieved.

As shown in FIG. 1, by way of example, in the embodiment, a further explanation is given by taking that the first liquid crystal panel 102 is a display panel (hereinafter denoted as 102), and the second liquid crystal panel 104 is a light-transmitting control panel (hereinafter denoted as 104).

The display panel 102 is used to achieve a display function, the display panel 102 at least includes a first substrate 1021, a second substrate 1022 and a liquid crystal cell, one of the first substrate 1021 and the second substrate 1022 is a color film substrate, and the other is an array substrate.

The light-transmitting control panel 104 is used to adjust a polarization angle of light, so as to control the transmission of light. The light-transmitting control panel 104 includes a first substrate 1041, a second substrate 1042 and a liquid crystal cell, one of the first substrate 1041 and the second substrate 1042 is an array substrate, and the other is an opposing substrate. It should be appreciated that, unlike the display panel 102, the light-transmitting control panel 104 is only used to control the transmission of the light and adjust the polarization angle of the light, and not used to display an image. Thus, the light-transmitting control panel 104 does not need to include a color filter.

The display assembly in the present embodiment further includes a first semi-transparent reflective layer 106 and a second semi-transparent reflective layer 107 located on two sides of the light-transmitting control panel, respectively.

The semi-transparent reflective layer means that, when light is incident at a surface of the semi-transparent reflective layer, a part of the light is allowed to pass through the semi-transparent reflective layer and a part of the light is reflected at the surface of the semi-transparent reflective layer.

Illustratively, in some embodiments, a reflectivity of each of the first semi-transparent reflective layer 106 and the second semi-transparent reflective layer 107 is not less than 30% and not more than 70%, and a light transmittance thereof is not less than 30% and not more than 70%.

The first semi-transparent reflective layer 106 is located between the second polarizer 103 and the light-transmitting control panel 104, the second semi-transparent reflective layer 107 is located on a side of the light-transmitting control panel 104 away from the second polarizer 103, and an area of an orthogonal projection of the second semi-transparent reflective layer 107 onto the third polarizer 105 is less than or equal to an area of the third polarizer 105.

In the embodiment, the first semi-transparent reflective layer 106 is located between the second polarizer 103 and the light-transmitting control panel 104, so it is able for the light passing through the third polarizer 105 to be reflected before arriving the second polarizer 103, thereby to improve the reflectivity for light while achieving the reflection function.

It should be appreciated that the semi-transparent reflective layer may be arranged alone or integrated with other structures.

A description is given by taking the first semi-transparent reflective layer 106 as an example. In an embodiment, the first semi-transparent reflective layer 106 is a separate sheet and is laminated with other structures sequentially. For example, the first semi-transparent reflective layer 106 may be arranged between the display substrate 102 and the second polarizer 103, or between the second polarizer 103 and the light-transmitting control panel 104.

The first semi-transparent reflective layer 106 may also be integrated with other structures. For example, in one embodiment, the first semi-transparent reflective layer 106 is a semi-transparent plating formed on a side of the second liquid crystal panel 104 close to the second polarizer 103.

In another embodiment, the first semi-transparent reflective layer 106 may also be a semi-transparent plating formed on the second polarizer 103, that is, the first semi-transparent reflective layer 106 is integrated with the second polarizer 103, in which case the second polarizer 103 may also be referred to as a reflective polarizer.

The second semi-transparent reflective layer 107 is arranged in a similar manner to the first semi-transparent reflective layer 106. For example, the second semi-transparent reflective layer 107 may be arranged alone. Alternatively, the second semi-transparent reflective layer 107 may be integrated with the light transmission control substrate 104 or the third polarizer, so as to form a one-piece structure.

In some embodiments, the array substrate of the display panel 102 is closer to the third polarizer than the color film substrate of the display panel 102. In other embodiments, the light-transmitting control panel 104 includes the array substrate and the opposing substrate, the array substrate of the light-transmitting control panel is closer to the third polarizer than the opposing substrate of the light-transmitting control panel.

A further explanation is given by taking an arrangement mode of the display panel 102 as an example. As shown in FIG. 1, the display panel 102 includes the first substrate 1021 and the second substrate 1022, the second substrate 1022 is closer to the third polarizer 105, and the first substrate 1021 is located on a side of the second substrate 1022 away from the third polarizer 105.

In some embodiments, the first substrate 1021 is the array substrate, the second substrate 1022 is the color film substrate, and it is able to achieve the reflection function and the display function.

In another embodiment, the first substrate 1021 is the color film substrate, and the second substrate 1022 is the array substrate. It is found through tests that a metal layer in the array substrate has a certain auxiliary function for realizing a reflection process, and may further improve the reflection effect, thereby to provide more clear imaging effect during the reflection process.

Specifically, the light-transmitting control panel 104 includes the first substrate 1041 and the second substrate 1042, one of the first substrate 1041 and the second substrate 1042 is the array substrate, and the other is the opposing substrate. In an embodiment, the first substrate 1041 is the opposing substrate, and the second substrate 1042 is the array substrate. In another embodiment, the first substrate 1041 is the array substrate, and the second substrate 1042 is the opposing substrate. When the second substrate 1042 is the array substrate, a metal layer in the array substrate may provide a certain light reflection effect, thereby to improve the imaging effect when the display assembly is used as a reflection device.

When the display assembly is to achieve the reflection function, light from a backlight source 108 passing through the first polarizer 101 is filtered as polarized light having an angle of an optical axis identical to an angle of a transmission axis of the first polarizer 101. Since the angle of the transmission axis of the first polarizer 101 and an angle of a transmission axis of the second polarizer 103 are different, the polarized light cannot pass through the second polarizer 103. Therefore, in this process, the light from the backlight source 108 cannot pass through the second polarizer 103, thereby reducing the influence of the backlight on the reflection process.

Figure 2A:
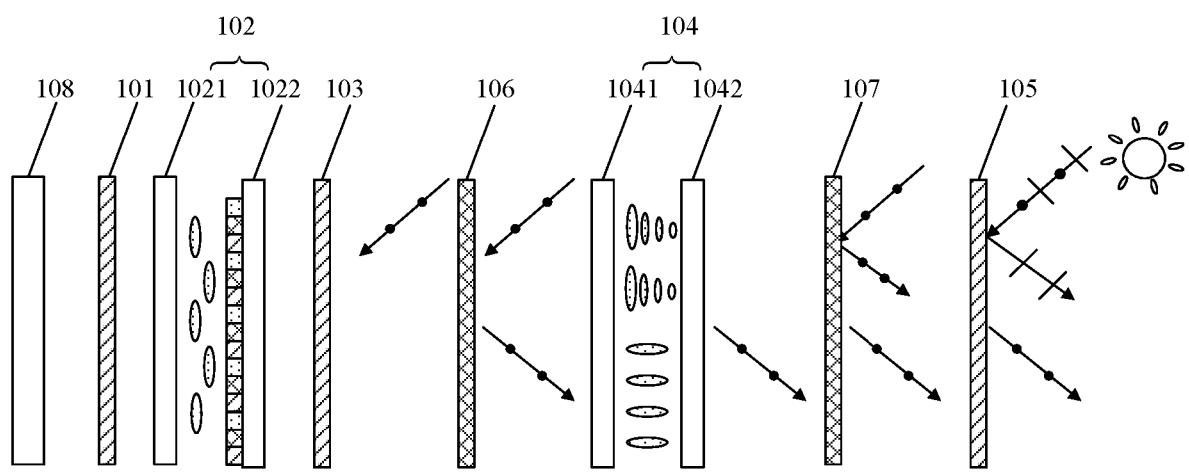
FIG. 2A is a schematic diagram showing an optical path of a display device in a reflection function according to an embodiment of the present disclosure.

As shown in FIG. 2A, an arrow denotes the light, and a dot on the arrow and a line crossing the arrow denote different polarization angles of the light. During the reflection function, external light passes through the third polarizer 105 and the second semi-transparent reflective layer 107 first. Due to the presence of the second semi-transparent reflective layer 107, a part of the light is reflected at a surface of the second semi-transparent reflective layer 107, and a part of the light passes through the second semi-transparent reflective layer 107 and the third polarizer 105. The light passing through the third polarizer 105 is polarized light having a polarization angle identical to the an angle of a transmission axis of the third polarizer 105, and the part of the light is further reflected at the first semi-transparent reflective layer 106 and then returns in a direction from the second polarizer 103 to the third polarizer 105.

It should be appreciated that, since the angle of the transmission axis of the second polarizer 103 and the angle of the transmission axis the third polarizer 105 are different, the light passing through the third polarizer 105 cannot pass through the second polarizer 103. An angle of a transmission axis of the first semi-transparent reflective layer 106 and an angle of a transmission axis of the second polarizer 103 are the same.

According to the technical solution of the embodiments of the present disclosure, through the first semi-transparent reflective layer 106 and the second semi-transparent reflective layer 107, when the external light is incident at the second semi-transparent reflective layer 107, a part of the light is reflected, and a part of the light is incident in a direction toward the first semi-transparent reflective layer 106 after passing through the second semi-transparent reflective layer 107, and is reflected again at a surface of the first semi-transparent reflective layer 106, thereby improving a reflectivity during the reflection function and improving the reflection effect when used as a mirror device.

Tests show that a reflectivity of the display device in the embodiments ranges from 40% to 70% during the reflection function, so as to provide a good reflection effect.

In some embodiments, a difference between the angle of the transmission axis of the first polarizer 101 and the angle of the transmission axis of the second polarizer 103 is 90 degrees. In some embodiments, the angle of the transmission axis of the first polarizer 101 and the angle of the transmission axis of the third polarizer 105 are the same.

In the embodiment, the angle of the transmission axis of the first polarizer 101 and the angle of the transmission axis of the third polarizer 105 may be set as 90°, and the angle of the transmission axis of the second polarizer 103 may be set as 0°. When the angle of the transmission axis of the first polarizer 101 and the angle of the transmission axis the second polarizer 103 are controlled to be perpendicular to each other, and the angle of the transmission axis of the second polarizer 103 and the angle of the transmission axis of the third polarizer 105 are controlled to be perpendicular to each other, it is able to prevent the light passing through the first polarizer 101 and the third polarizer 105 from passing through the second polarizer 103 in the case that the display panel 102 and the light-transmitting control panel 104 are each in a non-operation state, thereby reducing the influence on the display effect and the reflection effect.

The light reflected by the second semi-transparent reflective layer 107 faces in a direction toward an outer side of the display device, i.e., in a direction away from the backlight source 108. In other words, the light reflected by the second semi-transparent reflective layer 107 faces the third polarizer 105.

In some embodiments, the light reflected by the first semi-transparent reflective layer faces the third polarizer. In some embodiments, the light reflected by the first semi-transparent reflective layer faces the third polarizer and the first polarizer.

The light reflected by first semi-transparent reflective layer 106 at least faces in the direction toward the outer side of the display device, i.e., in a direction from the second polarizer 103 to the light-transmitting control panel 104.

In some embodiments, the light reflected by first semi-transparent reflective layer 106 further faces in a direction towards an inner side of the display device, i.e., in a direction from the second polarizer 103 to the display panel 102.

In the embodiment, the reflectivity of the first semi-transparent reflective layer 106 towards the display panel 102 and the reflectivity of the first semi-transparent reflective layer 106 toward the light-transmitting control panel 104 are each not less than 30%.

It should be appreciated that the reflectivity of the first semi-transparent reflective layer 106 toward the display panel 102 is mainly used to reduce a transmittance of light from the backlight source 108, thereby controlling a display brightness value and reducing the influence on the reflective effect during the reflection function.

Further, the first semi-transparent reflective layer 106 and the second semi-transparent reflective layer 107 may be made of a same material. For example, they may each be a semi-transparent film layer made of a material including, but not limited to, aluminum, silver, etc.

In an embodiment, a plurality of first semi-transparent reflective layers 106 is provided and is detachably arranged. In this way, the first semi-transparent reflective layer 106 may be removed or replaced with a reflective sheet with a larger or smaller reflectivity according to practical applications.

It should be appreciated that the larger the reflectivity of the first semi-transparent reflective layer 106 toward the display panel 102, the smaller the display brightness value, and the smaller the reflectivity thereof toward the display panel 102, the larger the display brightness value.

During the implementation, the first semi-transparent reflective layers 106 with different reflectivity may be replaced with as needed to meet different use requirements. For example, when used outdoors with sufficient light, a relatively large display brightness value is required for the display device, and when used indoors, the brightness value of the display device may be controlled to be relatively small.

The larger the reflectivity of the first semi-transparent reflective layer 106 towards the light-transmitting control panel 104, the better the reflection effect during a mirror reflection, and the smaller the reflectivity thereof towards the light-transmitting control panel 104, the smaller the reflectivity during the mirror reflection. During the implementation, the first semi-transparent reflective layers 106 having different reflectivity may be replaced with according to the practical need, so as to provide different reflective effects.

The display device is further provided in the embodiment of the present disclosure.

Figure 3:
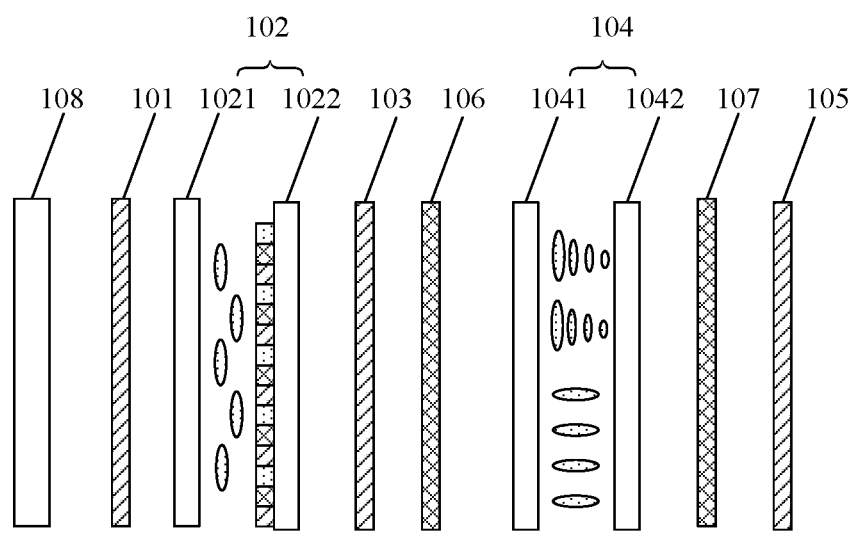
FIG. 3 is a schematic diagram of a third polarizer according to an embodiment of the present disclosure.

As shown in FIG. 3, the display device includes the backlight source 108 and the above-mentioned display assembly. The backlight source 108 is located on a side of the first polarizer 101 away from the first liquid crystal panel 102, and may be a diode or a light tube.

Since all the technical solutions of the above-mentioned display assembly are included in the embodiment, at least all the above-mentioned technical effects can be achieved, and the description thereof will not be repeated herein.

A method for controlling the above-mentioned display device is further provided in the embodiment of the present disclosure, including: in a case that a target display region of the display device is to achieve a reflection function, controlling a region, corresponding to the target display region, of the light-transmitting control panel to keep light in an original polarization state.

In some embodiments, the method further includes: in a case that the target display region of the display device is to achieve a display function, controlling a region, corresponding to the target display region, of the display panel to convert light into polarized light having a polarization angle identical to an angle of a transmission axis of the second polarizer, and controlling the region, corresponding to the target display region, of the light-transmitting control panel to convert light into polarized light having a polarization angle identical to an angle of a transmission axis of the third polarizer.

As shown in FIG. 2A, taking a case where the angle of the transmission axis of the third polarizer is 90° as an example, during the reflection function, the polarization state of the light passing through the light-transmitting control panel remains unchanged. Specifically, the polarization angle of the light passing through the third polarizer is 90°, and after the light passes through the light-transmitting control panel, the polarization angle thereof is still 90°. In this way, the light is reflected at the first semi-transparent reflective layer, and the light passing through the first semi-transparent reflective layer cannot pass through the second polarizer.

Still referring to FIG. 2A, when the display device is used to implement a reflection function, in order to avoid the influence of the backlight source on the reflective effect, at least one of the backlight source and the display panel is turned off. Thus, it is also able to reduce the power consumption of the display device.

In a case that the backlight source is in an off state, there is no light. In a case that the display panel is in an off state, the light emitted by the backlight source passes through the first polarizer and is filtered as the polarized light having the same angle as the angle of the transmission axis of the first polarizer. In the embodiment, taking a deflection direction of 90° as an example, the light passing through the display panel is still the polarized light at 90°. Since the angle of the transmission axis of the second polarizer is 0°, the light cannot pass through the second polarizer, thereby reducing the possible influence of the light emitted by the backlight source on the reflection effect.

Figure 2B:
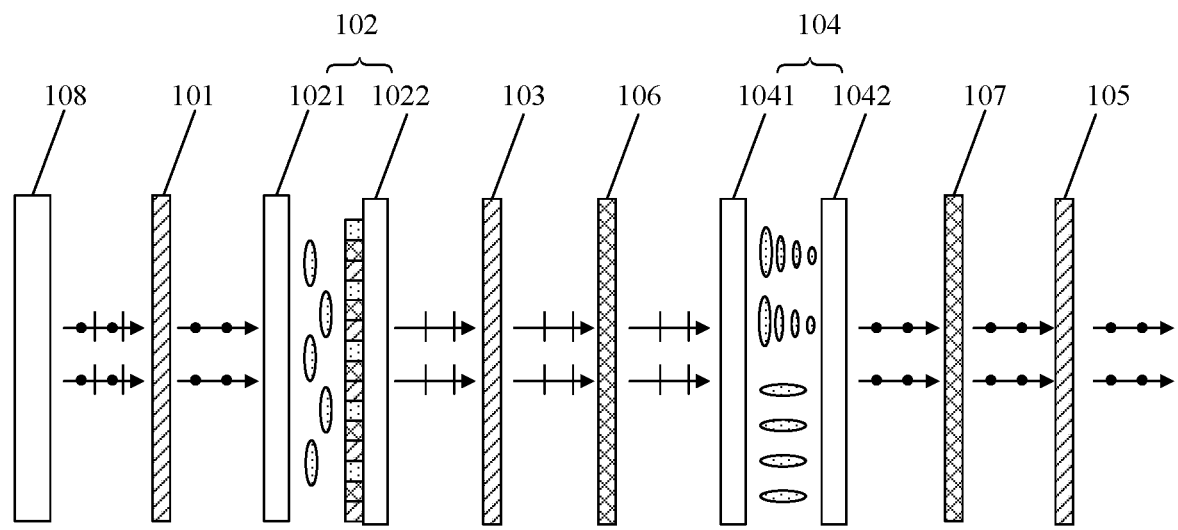
FIG. 2B is a schematic diagram showing an optical path of a display device in a display function according to an embodiment of the present disclosure.

As shown in FIG. 2B, during the display function, the display panel is controlled to be in an operation mode in which the polarization angle of light passing through the display panel is the same as the angle of the transmission axis of the second polarizer.

A description is given by taking a case that the angle of the transmission axis of the first polarizer is 90°, the angle of the transmission axis of the second polarizer is 0°, and the angle of the transmission axis of the third polarizer is 90° as an example.

Still referring to FIG. 2B, the light from the backlight source passing through the first polarizer is polarized light having the polarization angle of 90°, and then the light passes through the display panel and is converted into polarized light having an angle identical to the angle of the transmission axis of the second polarizer, i.e., polarized light of 0°, so the light is able to pass through the second polarizer.

The angle of the transmission axis of the light-transmitting control panel is the same as the angle of the transmission axis of the third polarizer. In the case that the above-mentioned polarized light having the polarization angle of 0° passes through the light-transmitting control panel, the light-transmitting control panel is in the operation mode, and converts the polarized light having the polarization angle of 0° into polarized light having an angle identical to the angle of the transmission axis of the third polarizer, i.e., polarized light having an angle of 90°, which is able to pass through the third polarizer, thereby achieving the display of an image.

It should be appreciated that the target display region may be referred to as an entire active display region of the display device or only a part of the active display region.

In some embodiments, at least one first region of target display regions of the display device is to provide the reflection function and at least one second region of the target display regions is to provide the display function, the second region is different from the first region, and the method further includes: controlling a region, corresponding to the at least one first region, of the light-transmitting control panel to keep light in the original polarization state; and controlling a region, corresponding to the at least one second region, of the display panel to convert light into polarized light having a polarization angle identical to an angle of a transmission axis of the second polarizer, and controlling a region, corresponding to the at least one second region, of the light-transmitting control panel to convert light into polarized light having a polarization angle identical to an angle of a transmission axis of the third polarizer.

Illustratively, in an embodiment, it is able to control a part of the display device to perform the display function and another part thereof to perform the reflection function. During the implementation, it is able to control different regions of the display panel and the light-transmitting control panel in different manners, so as to achieve the display or reflection function. Reference is made to the above description for specific control manners, which will not be repeated herein.

The first region and the second region may each be a part of the active display region, such as a half of the active display region. As another example, each first, or second region may be a region corresponding to any number of pixels, such as 10 pixels. The second region may be used to highlight a logo, etc.

In the method for controlling the display device of the present disclosure, the display function and the reflection function may be performed in different regions while improving the reflectivity. Since the display assembly of the present disclosure includes the first semi-transparent reflective layer and the second semi-transparent reflective layer, the reflectivity is significantly improved. In addition, since the light-transmitting control panel 104 does not include the color film substrate, which is substantially a liquid crystal display (LCD) panel capable of displaying a black-and-white image, in some embodiments, a black portion is displayed in some regions of the light-transmitting control panel 104, and a white portion is displayed in other regions, so as to enhance a contrast of the effective display region of the display device and enhance the display effect.

The above are merely specific embodiments of the present disclosure, but a protection scope of the present disclosure is not limited thereto. Any modifications or replacements that would easily occurred to a person skilled in the art, without departing from the technical scope disclosed in the disclosure, should be encompassed in the protection scope of the present disclosure. Therefore, the protection scope of the present disclosure shall be subject to the protection scope of the claims.

What is claimed is:

1. A display assembly, comprising a first polarizer, a first liquid crystal panel, a second polarizer, a second liquid crystal panel and a third polarizer laminated one on another sequentially, wherein one of the first liquid crystal panel and the second liquid crystal panel is a display panel, and the other is a light-transmitting control panel; and
    the display assembly further comprises a first semi-transparent reflective layer and a second semi-transparent reflective layer located on two sides of the light-transmitting control panel, respectively.

2. The display assembly according to claim 1, wherein the first liquid crystal panel is the display panel, and the second liquid crystal panel is the light-transmitting control panel.

3. The display assembly according to claim 2, wherein the second semi-transparent reflective layer is integrated with the third polarizer.

4. The display assembly according to claim 2, wherein an area of an orthogonal projection of the second semi-transparent reflective layer onto the third polarizer is less than or equal to an area of the third polarizer.

5. The display assembly according to claim 2, wherein light reflected by the second semi-transparent reflective layer faces the third polarizer.

6. The display assembly according to claim 1, wherein the first semi-transparent reflective layer and/or the second semi-transparent reflective layer are/is integrated with the light-transmitting control panel.

7. The display assembly according to claim 2, wherein the display panel comprises an array substrate and a color film substrate, and the array substrate of the display panel is closer to the third polarizer than the color film substrate of the display panel.

8. The display assembly according to claim 2, wherein the light-transmitting control panel comprises an array substrate and an opposing substrate, and the array substrate of the light-transmitting control panel is closer to the third polarizer than the opposing substrate of the light-transmitting control panel.

9. The display assembly according to claim 1, wherein a difference between an angle of a transmission axis of the first polarizer and an angle of a transmission axis of the second polarizer is 90 degrees, and the angle of the transmission axis of the first polarizer and an angle of a transmission axis of the third polarizer are the same.

10. The display assembly according to claim 9, wherein an angle of a transmission axis of the first semi-transparent reflective layer and the angle of the transmission axis of the second polarizer are the same.

11. The display assembly according to claim 10, wherein the first semi-transparent reflective layer is integrated with the second polarizer.

12. The display assembly according to claim 1, wherein a reflectivity of the first semi-transparent reflective layer toward the third polarizer and a reflectivity of the first semi-transparent reflective layer toward the first polarizer are each not less than 30%.

13. The display assembly according to claim 2, wherein light reflected by the first semi-transparent reflective layer faces the third polarizer.

14. The display assembly according to claim 2, wherein light reflected by the first semi-transparent reflective layer faces the third polarizer and the first polarizer.

15. The display assembly according to claim 1, wherein the first semi-transparent reflective layer is made of a same material as the second semi-transparent reflective layer.

16. A display device, comprising a backlight source and the display assembly according to claim 1.

17. The display device according to claim 16, wherein the first liquid crystal panel is the display panel, and the second liquid crystal panel is the light-transmitting control panel.

18. A method for controlling the display device according to claim 17, comprising:
    in a case that a target display region of the display device is to achieve a reflection function, controlling a region, corresponding to the target display region, of the light-transmitting control panel to keep light in an original polarization state.

19. The method according to claim 18, further comprising: in a case that the target display region of the display device is to achieve a display function, controlling a region, corresponding to the target display region, of the display panel to convert light into polarized light having a polarization angle identical to an angle of a transmission axis of the second polarizer, and controlling the region, corresponding to the target display region, of the light-transmitting control panel to convert the light into polarized light having a polarization angle identical to an angle of a transmission axis of the third polarizer.

20. The method according to claim 18, wherein at least one first region of target display regions of the display device is to achieve the reflection function and at least one second region of the target display regions is to achieve the display function, the second region is different from the first region, and the method further comprises:

controlling a region, corresponding to the at least one first region, of the light-transmitting control panel to keep light in the original polarization state; and controlling a region, corresponding to the at least one second region, of the display panel to convert light into polarized light having a polarization angle identical to an angle of a transmission axis of the second polarizer, and controlling a region, corresponding to the at least one second region, of the light-transmitting control panel to convert the light into polarized light having a polarization angle identical to an angle of a transmission axis of the third polarizer.

* * * * *